United States Patent Office 3,061,467
Patented Oct. 30, 1962

3,061,467
METHOD OF COATING METALS WITH AN AQUEOUS SOLUTION OF MONOORGANOSILANE
Harold L. Vincent, Midland, Mich., assignor to Dow Corning Corporation, Midland, Mich., a corporation of Michigan
No Drawing. Filed July 29, 1959, Ser. No. 830,201
6 Claims. (Cl. 117—127)

This invention relates to a method of coating metals to render them corrosion resistant.

A simplified flow diagram of the process is as follows:

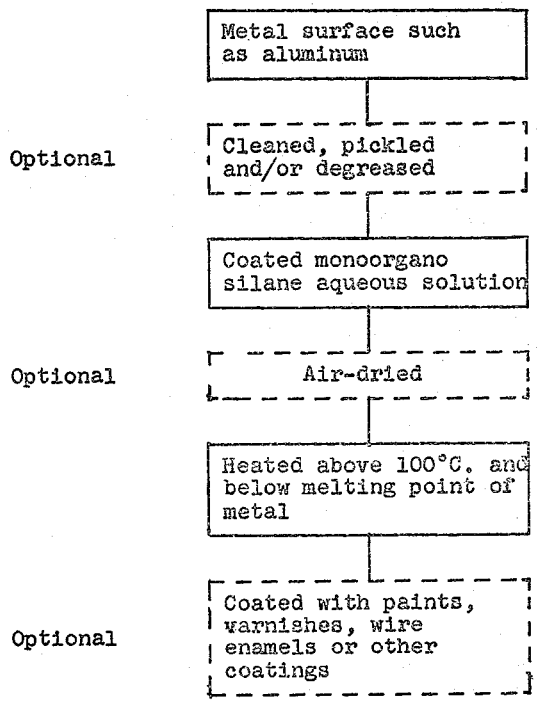

The search for corrosion resistant metals for containers, vehicles, buildings and literally thousands of uses has been carried out over many centuries. The existence of stainless steel, anodized aluminum, chrome plating, as well as specialized lacquers and protective coatings designed for use on metal bases is ample evidence of the variety of solutions proposed to solve this corrosion problem. The object of this invention is to introduce a new method for rendering metal surfaces corrosion resistant.

This invention offers a novel, economical and practical method for rendering metals corrosion resistant comprising coating the metal with an aqueous solution of a monoorganosilane or water soluble partial hydrolyzates of such silanes and curing the coating at an elevated temperature.

The metals which can be treated by the method of this invention are not known to be limited to any particular group of metals or alloys. However, the best results and the commercially significant embodiments are achieved with aluminum, zinc, magnesium, copper and steel.

The operable silanes are water-soluble materials having an average of about one monovalent hydrocarbon radical substituent attached to each silicon atom by C—Si bonding, the remaining valences of the silicon atoms being satisfied by organic groups attached to silicon by C—O—Si bonding. The operable silanes have the general formula $RSi(OR')_3$ where each R is a monovalent hydrocarbon radical including alkyl radicals of less than 6 carbon atoms such as methyl, ethyl, and propyl; monocyclic aryl radicals such as phenyl; and alkenyl radicals of less than 6 carbon atoms such as vinyl and allyl. The organic radicals represented by R' can be any monovalent organic radical such that the silane is water-soluble. Specific examples of radicals represented by R' are

—$CH_2CH_2OCH_3$, —$CH_2CH_2OCH_2CH_3$

—$CH_2CH_2OCH_2CH_2OCH_3$, —$CH_2CH_2OH$, and

—$CH_2CH_2(OCH_2CH_2)_nOH$ where n is greater than 1.

The silanes employed can all be of a single molecular species such as $CH_3Si[OCH_2CH_2OH]_3$ or they can be mixtures of two or more different species such as 50 percent $CH_3Si[OCH_2CH_2OH]_3$ and 50 percent $C_2H_5Si(OCH_2CH_2OCH_3)_3$ The silanes can have all of the OR' groups in each molecule of one type or they can be different as in $C_4H_9Si(OCH_2CH_2OCH_3)_2(OCH_2CH_2OH)$ and $CH_3Si(OCH_2CH_2OCH_2CH_3)(OCH_2CH_2OCH_2CH_2OCH_3)_2$ Water-soluble partial hydrolyzates of the silanes defined above are operable herein. It is believed that such partial hydrolyzates may be formed in the aqueous solutions employed herein. Such hydrolyzates have a minor proportion of the OR' groups hydrolyzed off the silane and concurrent condensation produces a siloxane having monovalent hydrocarbon substituents (R) and residual —OR' groups. So long as the hydrolysis and concurrent condensation are not carried forward to a point where water solubility is lost, any hydrolyzate of the defined silanes will be operative.

The silane or partial hydrolyzate can be admixed with water simply by adding one to the other and stirring the mixture. The resulting solution is applied to the metal surface by any desired means such as dipping, spraying, brushing and flowing. Following the application of the solution to the metal, the water can be evaporated off at room temperature or at an elevated temperature up to 100° C. The organosilicon compound remains on the surface of the metal.

The organosilicon compound is cured by heating the coated metal to at least 100° C. The upper limit on the curing temperature is dependent upon the melting point of the metal. Thus the range of curing temperature is from 1000° C. to the melting temperature of the metal being treated.

In addition to the organosilicon compound and water the mixtures employed herein can contain wetting agents to insure adequate contact between metal and solution to achieve the desired degree of coating on the metal surface. Any of the well-known water-soluble wetting agents are operable herein.

The treating solution can contain from .5% by weight of the silane to 60% by weight. Some of the operable silanes are miscible in all percentages with water but it becomes too expensive to treat metals with solutions containing more than 60% by weight silane even though such treatment will be effective. Some degree of corrosion resistance can be imparted with solutions containing less than .5% by weight silane but generally the corrosion resistance achieved is so slight as to be totally unsatisfactory.

The metal can often be treated without cleaning, pickling, degreasing or other preparation. However, the best results are achieved by pretreating the metal surface to obtain a clean, easily wettable surface before treating with the organosilicon-water solution. Steel wooling, degreasing with solvents, pickling and merely washing the metal surfaces have been found useful as pretreatments to prepare the surface for the corrosion resistant treatment of this invention.

The metals treated in accordance with this invention exhibit excellent resistance to corrosion by acids, bases, salt spray, oxygen and so forth. One suggested use of the treated metals is for food containers and another is for automobile trim. Furthermore, the treated metal accepts further coatings such as wire-enamels, lacquers, and other surface coatings. The treatment acts as a primer in many cases thus effecting improvement in the adhesion of subsequent surface coatings to the metal.

The following examples are included herein to further illustrate the method of this invention and not for purposes of restricting the scope of the invention. All parts and percentages are based on weight unless otherwise indicated.

*Example 1*

Magnesium panels 20 mils thick were cleaned with steel wool and dipped into a 3% solids water solution of $CH_3Si(OCH_2CH_2OCH_3)_3$. The panels were air dried and heated at 250° C. for 15 minutes to cure the silane. The resulting coated panel was dipped in normal HCl and showed no corrosion after 3 minutes whereas an untreated panel reacted violently in the HCl with extreme corrosion.

*Example 2*

Aluminum panels 10 mils thick were degreased with organic solvent and dipped in a 50% solids aqueous solution of $CH_3Si(OCH_2CH_2OCH_3)_3$ and were air dried and cured at 250° C. for 15 minutes. The treated panels were exposed to salt spray at 35° C. for 100 hours. At the end of this time the panels were examined and found to be free of corrosion. Aluminum clad steel was similarly treated with a 25% solids solution of the silane. The treated panels showed excellent resistance to corrosion in the salt spray at 35° C.

*Example 3*

Magnesium panels were cleaned and treated with a 50% water solution of $CH_3Si(OCH_2CH_2OCH_3)_3$ as in Example 1. Panels so treated were then immersed in toluene, acetone, methylisobutylketone, isopropanol, V. M. and P. naphtha, and a water solution of a commercial detergent. After 24 hours immersion, each of the panels remained bright and unaffected and remained uncorroded after three minutes immersion in normal HCl.

*Example 4*

Magnesium panels were steel wooled and pickled to remove the surface oxides and were then treated with a 50% solids solution of $CH_3Si(OCH_2CH_2OCH_3)_3$ in water. The panels were air dried and heated at 250° C. for 15 minutes to cure the coating. Analysis of the panels by reflective infrared analysis disclosed a considerable amount of Si-O-Mg bonding on the metal surface. This indicates a chemical bond between the metal and the silicon material on the surface.

*Example 5*

Copper wire was degreased and steel wooled to remove surface oxides. The bright surface of the copper wire was coated by dipping with a 50% solids solution of $CH_3Si(OCH_2CH_2OCH_3)_3$. The treated wire was air dried and placed with an untreated wire in an oven at 250° C. Within 1 hour the untreated wire was heavily oxidized and the treated wire remained bright and shining.

*Example 6*

When the method of Example 2 was repeated employing 10 percent solids in water solutions of $$CH_3Si(OCH_2CH_2OCH_2CH_3)_3$$
$$C_2H_5Si(OCH_2CH_2OCH_2CH_2OCH_3)_3$$
$$C_2H_4Si(OCH_2CH_2OH)_3$$

and mixtures of $$C_6H_5Si(OCH_2CH_2OCH_2CH_3)_3$$

and $$CH_3Si(OCH_2CH_2OH)_3$$

in place of the $CH_3Si(OCH_2CH_2OCH_3)_3$ similar results were achieved.

*Example 7*

When aluminum wire was employed in the method of Example 5, the results were similar.

*Example 8*

When zinc and steel panels and zinc coated steel panels were treated in accordance with Example 2, the treated panels displayed greatly improved resistance to acids, salt spray and oxidation.

That which is claimed is:

1. A method of improving corrosion resistance of metals comprising coating the metal surface with an aqueous solution containing .5 to 60 percent by weight of a water-soluble monoorganosilane of the general formula $RSi(OR')_3$ where R is a monovalent hydrocarbon radical selected from the group consisting of alkyl radicals of less than 6 carbon atoms, monocyclic aryl radicals and alkenyl radicals of less than 6 carbon atoms, and each R' is a radical selected from the group consisting of $$—CH_2CH_2OCH_3$$
$$—CH_2CH_2OCH_2CH_3$$
$$—CH_2CH_2OCH_2CH_2OCH_3$$
$$—CH_2CH_2OH$$

and $$—CH_2CH_2(OCH_2CH_2)_nOH$$

where $n$ is greater than 1, and curing the coating by heating at a temperature of at least 100° C.

2. A method comprising coating a metal surface selected from the group consisting of aluminum, zinc, magnesium, copper and steel with an aqueous solution containing .5 to 60 percent by weight of a water-soluble monoorganosilane of the general formula $RSi(OR')_3$ where R is a monovalent hydrocarbon radical selected from the group consisting of alkyl radicals of less than 6 carbon atoms, monocyclic aryl radicals and alkenyl radicals of less than 6 carbon atoms and each R' is a radical selected from the group consisting of $$—CH_2CH_2OCH_3$$
$$—CH_2CH_2OCH_2CH_3$$
$$—CH_2CH_2OCH_2CH_2OCH_3$$
$$—CH_2CH_2OH$$

and $$—CH_2CH_2(OCH_2CH_2)_nOH$$

where $n$ is greater than 1, and heating the coated metal to at least 100° C. to cure the coating.

3. A method of improving the corrosion resistance of metal surfaces comprising coating the surface with a water solution containing .5 to 60 percent by weight of a monoorganosilane of the general formula $RSi(OR')_3$ where R is a monovalent hydrocarbon radical selected from the group consisting of alkyl radicals of less than 6 carbon atoms, monocyclic aryl radicals and alkenyl radicals of less than 6 carbon atoms and each R' is a radical selected from the group consisting of $$—CH_2CH_2OCH_3$$
$$—CH_2CH_2OCH_2CH_3$$
$$—CH_2CH_2OCH_2CH_2OCH_3$$
$$—CH_2CH_2OH$$

and $$—CH_2CH_2(OCH_2CH_2)_nOH$$

where $n$ is greater than 1, air drying the coated metal, and heating the coated metal to a temperature of at least 100° C. but below the melting point of the metal.

4. The method of claim 3 wherein the metal is selected from the group consisting of aluminum, zinc, magnesium, copper and steel.

5. The method of claim 3 wherein the metal is aluminum, the monoorganosilane is $CH_3Si(OCH_2CH_2OCH_3)_3$ and the curing temperature is at least 250° C. but less than 600° C.

6. The method of claim 3 wherein the metal is magnesium and the monoorganosilane is $$CH_3Si(OCH_2CH_2OCH_3)_3$$

References Cited in the file of this patent

UNITED STATES PATENTS

| | | | |
|---|---|---|---|
| 2,559,342 | Burkhard | July 3, | 1951 |
| 2,672,104 | Clark | Mar. 16, | 1954 |
| 2,742,368 | Rossiter et al. | Apr. 17, | 1956 |
| 2,930,106 | Wrotnowski | Mar. 29, | 1960 |
| 2,965,515 | Jellinek | Dec. 20, | 1960 |
| 2,968,616 | Bernard | Jan. 17, | 1961 |

OTHER REFERENCES

McGregor: Silicones and Their Uses, pp. 201, 237, McGraw-Hill, New York, 1954.